UNITED STATES PATENT OFFICE.

DAVID PARKHURST, OF GLOUCESTER, MASSACHUSETTS.

IMPROVED PAINT FOR SHIPS' BOTTOMS.

Specification forming part of Letters Patent No. 48,583, dated July 4, 1865.

*To all whom it may concern:*

Be it known that I, DAVID PARKHURST, of Gloucester, in the county of Essex, State of Massachusetts, have invented an Improvement in Paint for Ships' Bottoms; and I do hereby declare that the following is a full, clear, and exact description thereof, and mode of making the same.

The object of my invention is to prevent the fouling of ships' bottoms by the adhesion of shell-fish, weeds, or other substances; and this I effect by means of my improvement in paint, which is applied with a brush in the ordinary manner.

The basis of my invention consists in the combination or mixture of regulus of metallic copper, white arsenical oxide of copper, and a very heavy kind of brown ocher or oxide of iron mixed with tar or tar-oil. Naphtha will do instead of tar-oil.

In order to make this paint, first, into a tank of suitable size I pour of common vegetable tar, forty gallons; of tar-oil, (naphtha will do,) twenty-five gallons. This mixture should be allowed to stand about twenty-four hours, covered closely. This is to allow a sediment to be deposited, consisting of impurities and such heavy substances as are not soluble in the mixture. The liquid is then drawn off into another vat, when thirty-five gallons of the dry mixture of iron and copper, finely pulverized, is added, and after being well stirred the paint is fit for use.

The dry powder which I add to the liquid is, for ships of wooden bottoms, prepared in the following manner: To twenty gallons of finely-pulverized brown ocher or oxide of iron is added a mixture of metallic copper, twenty gallons, the metallic copper and arsenical oxide to exist in equal parts in the mixture. For ships of iron bottoms the paint is composed of a mixture of twenty gallons of tar-oil and forty gallons of vegetable tar, with a dry composition of thirty gallons of oxide of iron mixed with ten gallons of arsenical oxide of copper.

By experiment I have found that paint prepared in this way protects the bottoms of vessels from becoming foul more effectually and for a longer period than any other now used for that purpose. When so prepared the paint is very adhesive, and may be applied to the hulls of vessels in the ordinary manner. The tar is used instead of oil, so as not to incrust and form a hard surface on the vessel's bottom. Tar-oil or naphtha or benzine is used to thin the tar, so that it can be used with a brush. Arsenical oxide of copper is used to kill the shell-fish and worms which destroy the plank on the vessel's bottom. Iron is used to prevent the grass and weeds from growing. Copper is used to oxidize the iron, so as to make it gradually wash from the plank to prevent the grass and weeds from growing on it.

What I claim, and desire to secure by Letters Patent, is—

The composition prepared substantially as hereinbefore set forth, and for the purpose specified.

DAVID PARKHURST.

Witnesses:
R. H. EDDY,
H. E. FISHER.